No. 651,176. Patented June 5, 1900.
J. F. BEINS.
APPARATUS FOR SATURATING LIQUIDS WITH GASES.
(Application filed Dec. 21, 1897.)
(No Model.)
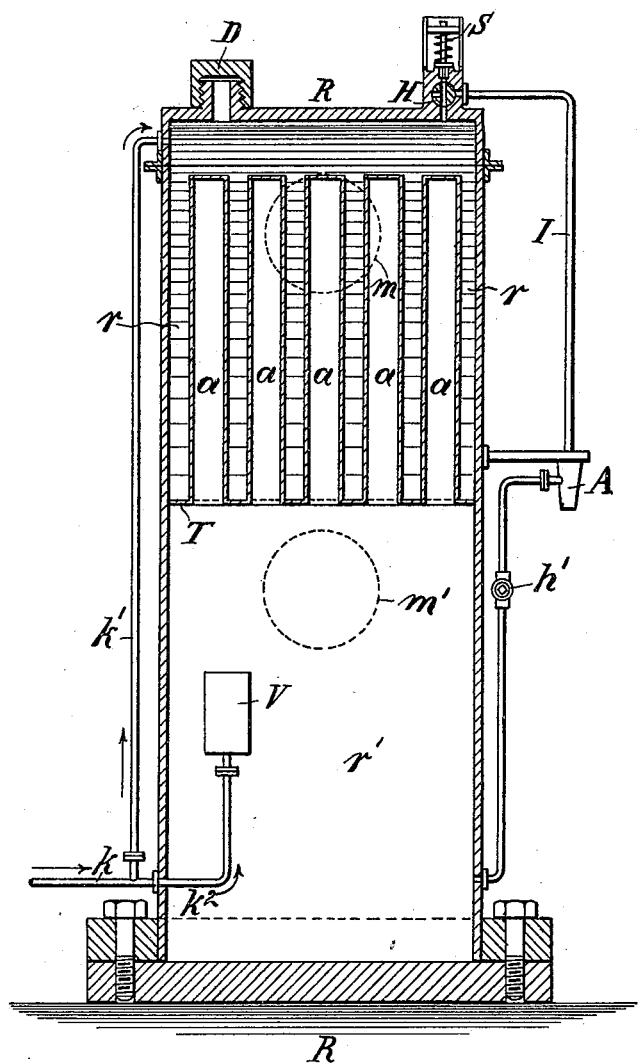
Witnesses:
F. W. Wright.
S. C. Connor
Inventor
Jan Frederik Beins
By
Howson and Howson
His Attorneys

UNITED STATES PATENT OFFICE.

JAN FREDERIK BEINS, OF ROTTERDAM, NETHERLANDS.

APPARATUS FOR SATURATING LIQUIDS WITH GASES.

SPECIFICATION forming part of Letters Patent No. 651,176, dated June 5, 1900.

Application filed December 21, 1897. Serial No. 662,821. (No model.)

*To all whom it may concern:*

Be it known that I, JAN FREDERIK BEINS, chemist, of No. 1 B. Hofmanplein, Rotterdam, Netherlands, have invented certain new and useful Improvements in Apparatus for Saturating Liquids with Gases, (for which Letters Patent have been obtained in Germany, No. 79,128, dated May 30, 1894; in Belgium, No. 110,207, dated May 30, 1894; in France, No. 238,898, dated May 30, 1894, and in Great Britain, No. 10,523, dated May 30, 1894;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in apparatus for saturating liquids with gases.

By my improved method the liquid is brought in a finely-divided condition into a chamber containing the gas with which it is to be saturated under pressure, so that the gas may be absorbed at the moment the liquid comes into contact with it, a special mixing or agitating mechanism being rendered unnecessary.

In apparatus constructed in accordance with this invention the liquid to be saturated with gas is forced into a saturating-compartment through porous material, the gas to be absorbed by the liquid being confined in that compartment under the pressure desired for effecting absorption.

In the accompanying drawing an apparatus adapted for carrying out my invention is represented in vertical section.

By way of example I will describe my invention as applied in saturating water with carbonic-acid gas, though it will be understood that other liquids may be saturated with air, oxygen, ammonia, or other gas on the same system.

The apparatus I employ comprises a closed vessel or chamber R, preferably cylindrical in form. Its walls must be sufficiently thick and strong to withstand the pressure which is required to bring about absorption, and they are therefore usually made of metal. This chamber or vessel is divided by a partition T into two compartments $r\ r'$, one above the other. Into the partition are tightly fitted tubes $a\ a$, of porous earthenware or other material. The upper ends of the porous tubes $a\ a$ are closed and project into the compartment $r$, which contains the liquid to be eventually saturated, while their open ends terminate in the compartment $r'$, which acts as the absorption or saturating compartment. The precise shape of the porous tubes is of secondary importance, and caps, domes, or other suitably-constructed porous bodies may, if preferred, be substituted for the tubes. If desired, the partition or diaphragm T may be porous and may be integral with the porous tubes, caps, domes, or bodies. The upper compartment $r$ is provided with a safety-valve S and a charging-orifice D, capable of being closed when required, and each of the compartments $r\ r'$ may be respectively furnished with a pressure-gage, (indicated by the dotted circles $m\ m'$.) The pipe $k$ for the gas-supply may be divided into two branches $k'\ k^2$, the branch $k'$ leading into the liquid-compartment $r$ and the other branch $k^2$ into the absorption-compartment $r'$. The latter branch is preferably provided with a valve V, which may be so weighted that the gas in the absorption-compartment is compressed to a predetermined degree less than that which is conveyed into the liquid-compartment, although gas is forced through both the branches $k'\ k^2$ under the same pressure. The liquid-compartment having been filled through the feeding-orifice D with the liquid to be saturated and this orifice having been closed, the gas to be absorbed is introduced under pressure to the gas-supply pipe $k$ and branches $k'\ k^2$. In the case of carbonic-acid gas, which like other gases may be obtained in the market in a compressed condition in special reservoirs, it is only necessary to connect such a reservoir with the gas-supply pipe $k$ and to open the cock with which such pipe is fitted. Supposing it is desired that the carbonic acid should be admitted at a pressure of three atmospheres and that the valve V on the branch $k^2$ leading into the absorption-compartment is weighted to one atmosphere, the pressure of the gas will be three atmospheres in the liquid-compartment $r$ and two atmospheres in the absorption-compartment $r'$. The liquid is thus forced through the walls of the porous tubes $a$ and the diaphragm T into the absorption-compartment $r'$ under an effective pressure of one atmosphere, being the difference between the pressures in the two compartments, and arrives in a finely-divided condition in contact with the carbonic acid under a pressure of two atmospheres, with the result that it is immediately and thoroughly saturated with carbonic acid, whereupon it descends into the lower part of the absorption-compartment $r'$ ready for withdrawal.

The degree of saturation may be varied by altering the pressure under which the liquid meets the gas to be absorbed. The speed with which the liquid enters the absorption-compartment after permeating the porous walls may be controlled by regulating the difference between the pressures in the two compartments, which can be effected by means of the valve V on the branch $k^2$, communicating with the absorption-compartment $r'$.

It will be understood that the gas instead of being supplied direct from the reservoirs in which it is confined under pressure may be fed to the apparatus by means of a pump connected with the supply-pipe $k$. If desired, the pressure under which the liquid to be treated is forced through the porous material may be produced by pumping gas into the liquid-compartment without the use of the branch pipe $k'$. Again, it is possible, especially in the manufacture of mineral waters, to connect the water-pipe directly with the liquid-compartment, so that the existing pressure of the liquid may be utilized.

From the foregoing description it will be understood that without the employment of any stirring or agitating mechanism and even without the use of a pump the improved apparatus enables liquid highly saturated with gas to be produced.

For enabling liquids saturated with gas by means of the improved apparatus hereinbefore described to be bottled with a minimum loss of gas and reduction of pressure a three-way cock H is provided between the safety-valve S and the liquid-compartment, and a pipe I, leading from the said cock H to the discharge-nozzle A. The gas escaping from the bottle while it is being filled with saturated liquid is conducted through the pipe I and cock H to the safety-valve S. The discharge-nozzle A is, moreover, in communication with the lower portion of the absorption-compartment $r'$ by way of the discharge-pipe $h$, provided with a cock $h'$.

When it is desired to bottle liquid the saturation of which with gas has just been completed, the safety-valve S may be adjusted until the pressure it controls is lower than that indicated by the gage $m'$ on the absorption-compartment $r'$, the three-way cock H being turned until the pipe I from the discharge-nozzle A communicates with the safety-valve S. The bottle is then pressed with its orifice against the discharge-nozzle A, whereupon the discharge-cock $h'$ is opened. The bottle immediately becomes full of saturated liquid, while the air from the bottle escapes by way of the pipe I through the safety-valve S. In this manner the liquid saturated with gas under pressure may be drawn off with a minimum loss of gas and liquid. If desired, the apparatus may be combined with a stoppering-machine of suitable construction.

It will be obvious that, if preferred, the safety-valve may remain set for the original pressure, as it will generally be possible to produce a sufficient difference of pressure in the compartment for enabling the saturated liquid to be forced into the bottles in the desired condition.

Having now particularly described my invention, what I claim, and desire to secure by Letters Patent, is—

In apparatus for saturating liquid with gases in such a manner that this liquid is forced through a porous material into the saturation-chamber, the combination of a liquid-reservoir, an absorption-chamber and a porous sheet or partition separating the same, with means for feeding the gas to be absorbed by the liquid through tubes which enables the gas to be conveyed both to the liquid-reservoir and to the absorption-chamber at the same time, but at a higher pressure as regards the former, a suitable pressure-reducing device being provided in the conduit leading to the absorption-chamber, whereby the liquid is forced from the liquid-reservoir through the porous sheet or partition or through porous bodies into the absorption-chamber, substantially as set forth.

In testimony that I claim the foregoing as my invention I have signed my name in presence of two subscribing witnesses.

JAN FREDERIK BEINS.

Witnesses:
 S. LISTOE,
 AIRR H. VOORWINDEN.